July 20, 1943.    A. G. GURRIES    2,324,576
ROTARY VALVE
Filed Oct. 10, 1941    3 Sheets-Sheet 1
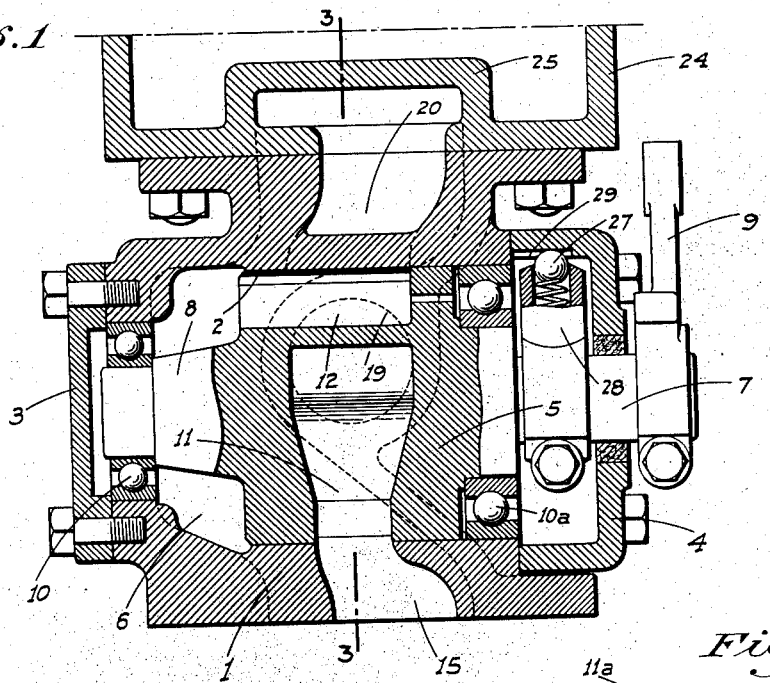
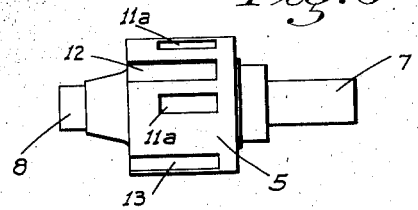
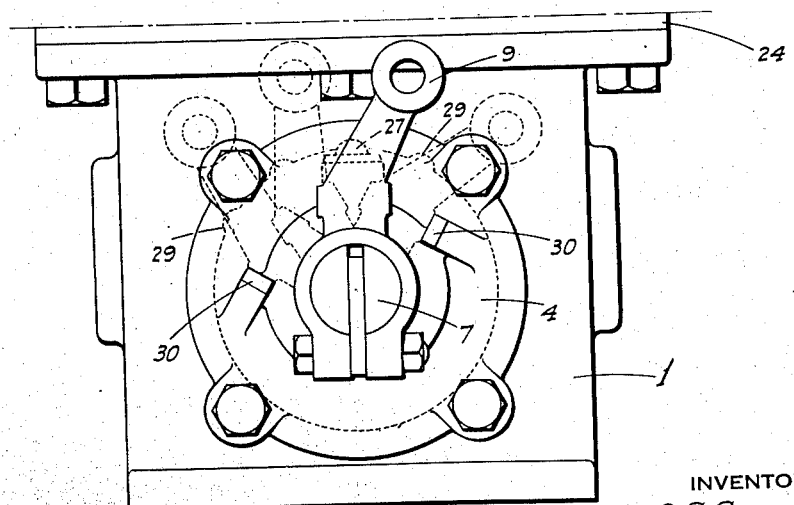
INVENTOR
A. G. Gurries
BY
ATTYS

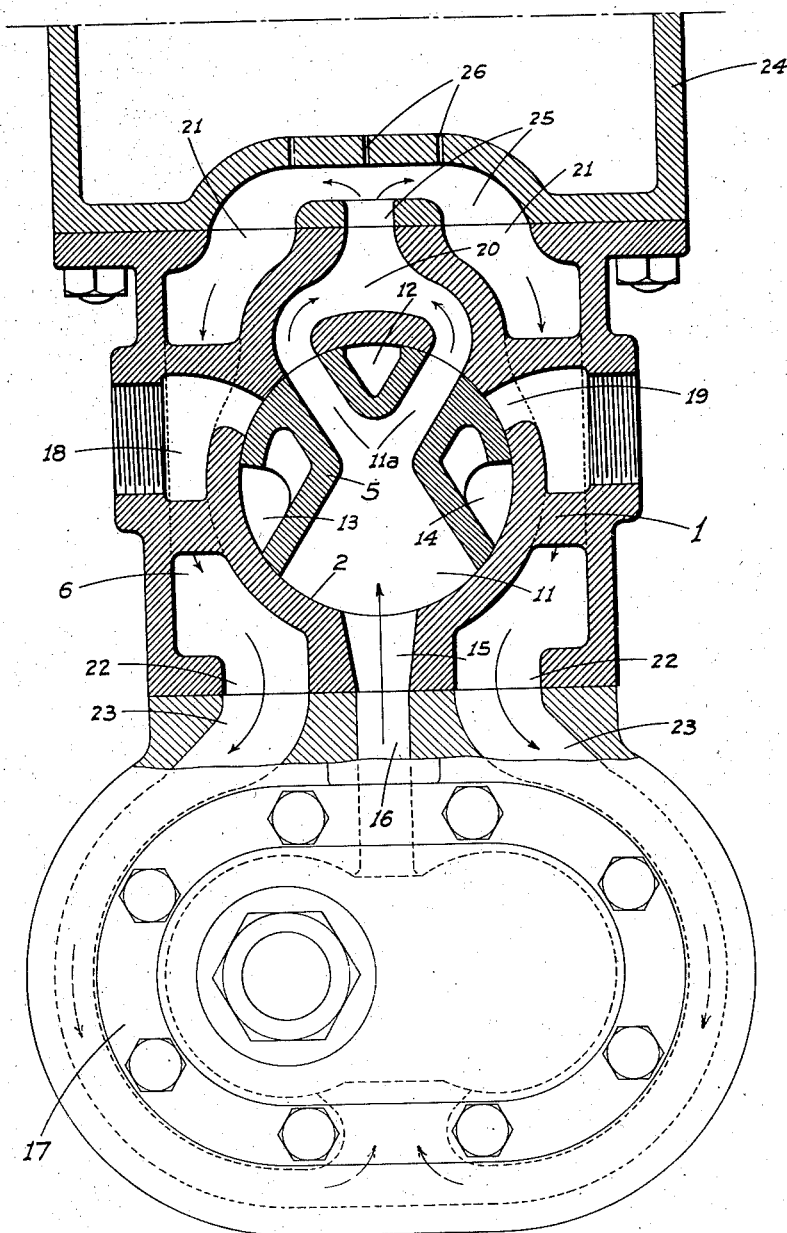

INVENTOR
A. G. Gurries

Patented July 20, 1943

2,324,576

UNITED STATES PATENT OFFICE 2,324,576

ROTARY VALVE

Albert G. Gurries, Gilroy, Calif.

Application October 10, 1941, Serial No. 414,472

2 Claims. (Cl. 251—155)

This invention relates to a rotary valve, and particularly to one adapted for high pressure service to control the flow of oil or similar fluid from a source of pressure to a hydraulic cylinder or other hydraulic mechanism.

One of the objects of my invention is to provide a valve having a plurality of different positions which may be attained with a minimum of arcuate movement of the valve rotor between adjacent positions.

Another object is to so port and passage the valve structure that the oil may flow therethrough with a minimum of restriction and thus avoid the excessive heating of the oil which is detrimental to the oil itself and to any hose through which the oil may flow after leaving the valve.

A further object of the invention is to produce a simple and inexpensive device and yet one which will be exceedingly effective for the purpose for which it is designed.

These objects I accomplish by means of such structure and relative arrangement of parts, as will fully appear by a perusal of the following specification and claims.

In the drawings similar characters of reference indicate corresponding parts in the several views:

Figure 1 is a sectional elevation of the valve, showing the rotor in the holding position.

Figure 2 is an end view of the valve, showing the control handle.

Figure 3 is a transverse section on line 3—3 of Fig. 1 and showing the valve as mounted on a pump.

Figure 6 is a detached elevation of the valve rotor.

Figure 4:
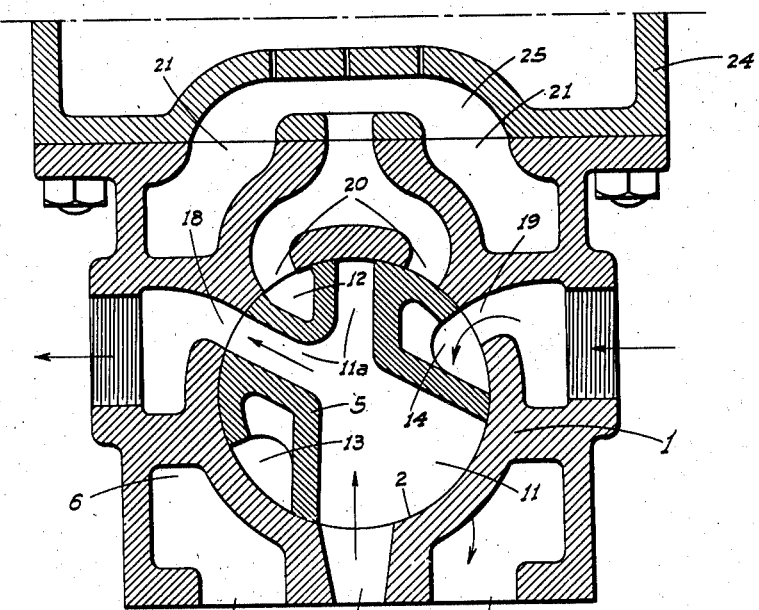
Figures 4 and 5 are transverse sections of the valve showing the rotor in feed-and-release and floating positions respectively.

Referring now more particularly to the characters of reference on the drawings, the valve comprises a body 1 having a cylindrical bore 2, and closed at one end by a plate 3 and at the other end by a cupped head 4. The valve rotor 5 is turnable in bore 2 and is shorter than the bore, leaving a chamber 6 in the body between the rotor and end plate 3, which is closed by the adjacent end of the rotor. The rotor is formed with end stub shafts 7 and 8 of reduced size. Shaft 7 projects through head 4 and has an operating handle 9 thereon, while shaft 8 terminates inside plate 3 and is engaged by a ball bearing 10 disposed so as not to obstruct chamber 6.

The rotor is provided with a diametral passage 11 having circumferentially spaced branches 11a at one end, a peripheral port 12 between branches 11a leading to chamber 6 as shown in Fig. 1, and opposed side peripheral ports 13 and 14 between branches 11a and the opposed end of port 11 and also leading to chamber 6. Bleed communication is also provided between one or more of these ports and the cap 4, as indicated in Fig. 1, to equalize the pressure as well as to lubricate the adjacent rotor bearing 10a.

The body has an intake passage 15 leading to bore 2 to always communicate with passage 11 and with the discharge passage 16 of the pressure gear pump 17 on top of which the valve body is mounted, opposed side passages 18 and 19 also leading to the bore 2 to communicate alternately with branch passages 11a and ports 13 and 14, and other circumferentially spaced passages 20 disposed symmetrically between passages 18 and 19 and leading to a junction at the top of the valve body, the spacing of passages 20 at bore 2 being the same as that of branches 11a.

Chamber 6 is provided with ports 21 exposed to the top of the body in transversely spaced relation to passages 20, and also has bottom ports 22 communicating with the intake passages 23 of the pump and which lead to a common termination between the gears of the pump in opposed relation to the discharge passage 16.

It should be noted that while chamber 6 is beyond the rotor, the ports 21 and 22 are alined with the rotor communicating passages 15 and 20; this arrangement being obtained by suitably passaging the body between the chamber and said ports as indicated by dotted lines in Fig. 1.

An oil supply reservoir 24 is mounted on top of the valve body, said reservoir being formed with a passage 25 establishing permanent communication between passage 20 and ports 21. The top wall of the passage 25 is provided with bleed openings 26.

In operation, when the rotor is disposed in the holding position shown in Fig. 3, passages 18 and 19 (which lead to and from the hydraulic unit being controlled) are shut off, ports 12, 13 and 14 are likewise shut off, and passages 20 and 11a are in full register, as well as passages 11 and 15. No oil can therefore enter or leave the hydraulic unit, which is held, and the oil will circulate from the pump through the valve, passages 20 and 25 and into chamber 6 and back to the pump.

When the rotor is turned to the position shown in Fig. 4, oil will flow from the pump through one branch 11a and passage 18 to the hydraulic unit and will return to the pump from said unit through passage 19, port 14 and chamber 6. The other branch 11a is shut off, while port 12 is open to passage 20 to supply additional oil to the pump through chamber 6, should it be needed.

If the valve is turned in the opposite direction, oil is fed into passage 19 and returned to the pump from passage 18, as will be obvious.

Figure 5:
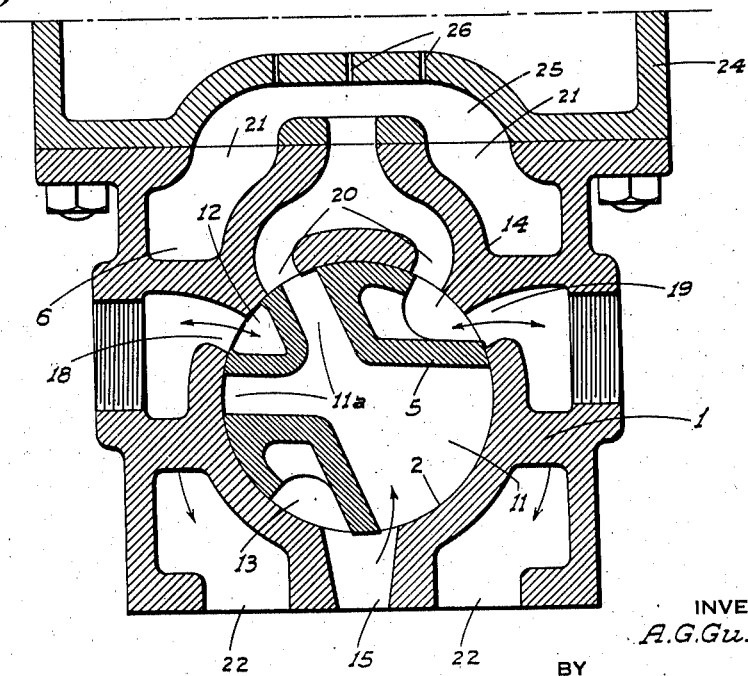

When the valve rotor is fruther turned to the floating position shown in Fig. 5, oil can circulate from the pump through the valve and back to the pump; through passage 11, one of the branches 11a, one of passages 20 and 25 and thence through chamber 6. The oil can also pass through port 13 directly to chamber 6. At the same time, port 12 is in communication with passage 18, allowing return of oil from the hydraulic unit into chamber 6, while passage 19 is in communication with port 14, which is also in communication with the other passage 20 as well as with chamber 6 direct. The hydraulic mechanism is thus free to float or to be moved by an outside force.

The various positions of the rotor as above described are obtained with a relatively small arcuate movement of the rotor (approximately 30°) between each position, by reason of the specific passaging and porting arrangement used, and particularly chamber 6 and the various rotor ports communicating therewith. At the same time, the passages are large and the high pressure oil can flow through the valve with a minimum of friction and resistance, so that overheating is avoided.

Locating means for the different positions of the rotor is provided in the form of a spring pressed ball 27 mounted in a socket 28 clamped on shaft 7 within the head 4; the ball successively engaging depressions 29 in the bore of the head upon turning of the rotor to its different positions. Turning of the rotor is positively limited by stop lugs 30 on the outside of the head projecting into the path of handle 9.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rotary valve comprising a body having a cylindrical bore and a chamber beyond one end of the bore, a valve rotor turnable in the bore and at one end forming an end wall of the chamber, opposed passages in the body leading from the bore for connection with opposite ends of a hydraulic unit, a pressure intake passage in the body leading to the bore from one exterior face of the body and an outlet passage in the body leading from the chamber to a termination at said face in alinement with the adjacent end of the intake passage transversely of the rotor; said rotor being passaged and ported to establish communication in predetermined order between the various body passages.

2. A rotary valve comprising a body having a cylindrical bore and a chamber beyond one end of the bore, a valve rotor turnable in the bore and at one end forming an end wall of the chamber, opposed passages in the body leading from the bore for connection with opposite ends of a hydraulic unit, a pressure intake passage in the body leading to the bore from one exterior face of the body and an outlet passage in the body leading from the chamber to a termination at said face in alinement with the adjacent end of the intake passage transversely of the rotor, all said passages terminating at the bore in substantially the same plane lengthwise of the rotor; the latter being passaged and ported to establish communication in predetermined order between the various body passages.

ALBERT G. GURRIES.